United States Patent [19]
Gerber et al.

[11] 3,790,154
[45] Feb. 5, 1974

[54] APPARATUS FOR HOLDING SHEET MATERIAL AND OTHER OBJECTS DURING WORKING

[75] Inventors: Heinz Joseph Gerber; David R. Pearl, both of West Hartford, Conn.

[73] Assignee: Gerber Garment Technology, East Hartford, Conn.

[22] Filed: Dec. 17, 1971

[21] Appl. No.: 209,394

Related U.S. Application Data

[63] Continuation of Ser. No. 7,462, Feb. 2, 1970, abandoned, which is a continuation-in-part of Ser. No. 821,780, May 5, 1969, Pat. No. 3,495,492.

[52] U.S. Cl.................................... 269/22, 83/451
[51] Int. Cl............................ B23q 3/06, B26d 7/02
[58] Field of Search....... 269/21, 22; 83/14, 29, 451

[56] References Cited
UNITED STATES PATENTS

| | | | |
|---|---|---|---|
| 3,294,392 | 12/1966 | Dunham | 269/21 |
| 3,433,699 | 3/1969 | Rumble | 269/22 X |

*Primary Examiner*—Donald G. Kelly
*Assistant Examiner*—E. F. Desmond
*Attorney, Agent, or Firm*—McCormick, Paulding & Huber

[57] ABSTRACT

Apparatus for holding sheet material and other objects during cutting or other work thereon includes a vacuum holddown device having a supporting surface including a plurality of vacuum openings passing therethrough. A vacuum chamber associated with the supporting surface applies a vacuum through the vacuum openings to the sheet material or other object or objects received thereon. A sheet or panel of substantially air-impervious sheet material, such as a sheet of thin polyethylene, is spread over the exposed surface of the work and cooperates with the vacuum to draw the work toward the supporting surface and, if it is compressible, into a more compact condition. The air-impervious panel used with the vacuum may be an expendable sheet of such material spread entirely over the surface of the work prior to working thereon and/or may be one or two continuous belts of such material located in front of and/or behind an associated tool. In cases where the work is a layup of garment fabric, the vacuum and air-impervious panel may also be used to hold the layup in a compact condition for a long period of time between the laying up process and the cutting or other work process to prevent the various layers of the layup from shifting, flowing or otherwise moving relative to one another so as to depart from their relative positions as initially laid up.

17 Claims, 11 Drawing Figures

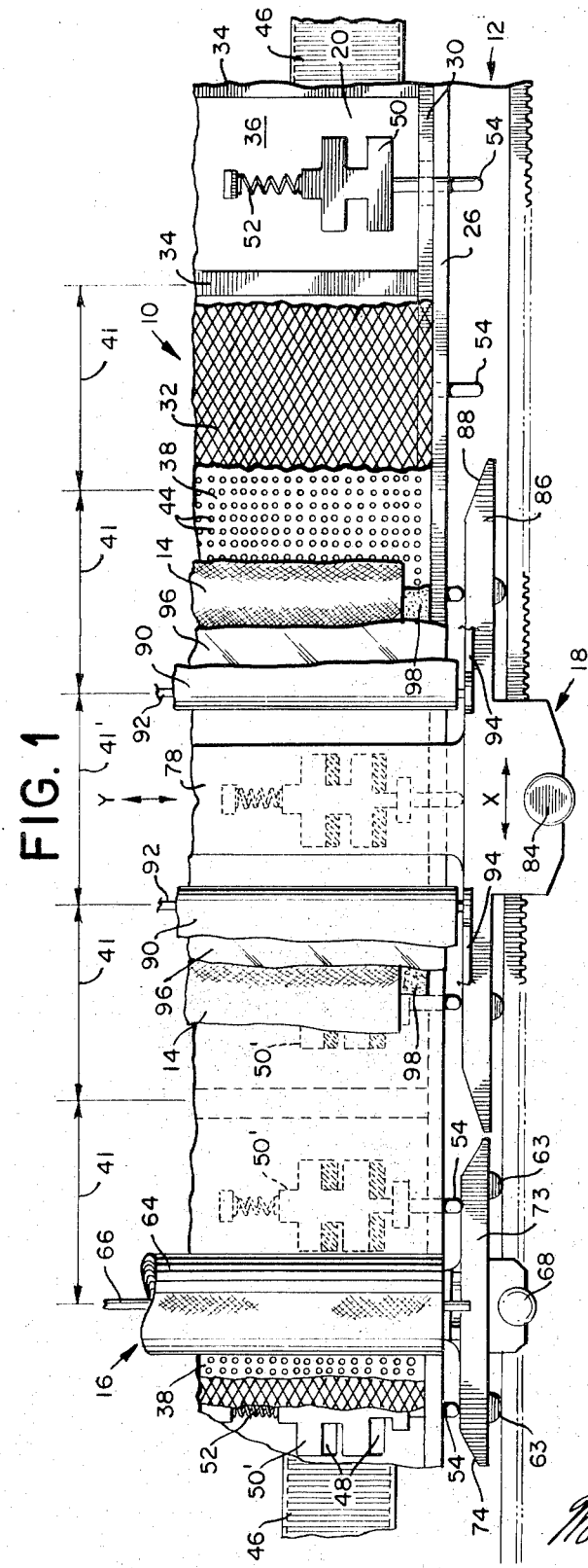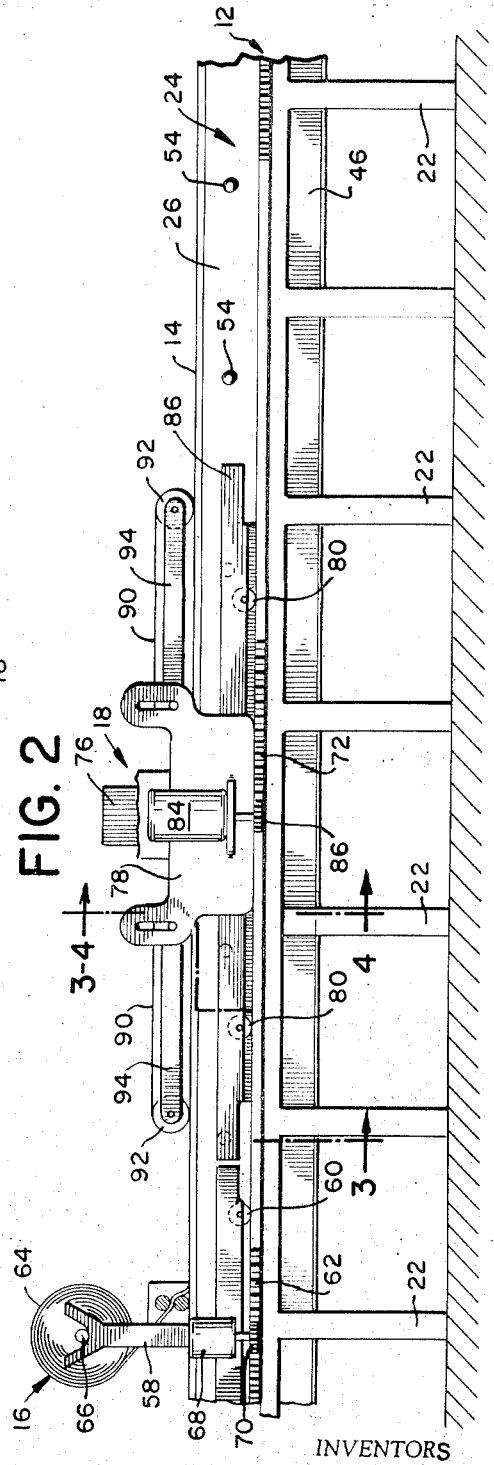

3,790,154

APPARATUS FOR HOLDING SHEET MATERIAL AND OTHER OBJECTS DURING WORKING

CROSS REFERENCE TO RELATED APPLICATION

This application is a continuation of pending prior application Ser. No. 7,462 filed Feb. 2, 1970, now abandoned which in turn is a continuation-in-part of prior application Ser. No. 821,780 filed May 5, 1969, now U.S. Pat. No. 3,495,492.

BACKGROUND OF THE INVENTION

This invention relates to apparatus for holding sheet material and other objects during work thereon, and particularly for holding layups of sheet material in a compact condition for cutting.

One object of this invention is to provide an improved means for holding objects, such as irregularly shaped workpieces and layups of fabric, in a stable rigid position during the performance of work or other operations thereon.

Another aim of the present invention is to provide an improved apparatus of the aforedescribed type capable of holding one or more layers of fabric or other sheet material in a compact, stable and non-shifting position so as to be readily cut or otherwise worked without the need for applying hand pressure thereto.

A more specific aim of the present invention is to provide improved apparatus for holding one or more layers of fabric in a suitable condition for work thereon by an automatically controlled cutter or other similar tool.

SUMMARY OF THE INVENTION

In accordance with the invention, a work holding apparatus is provided which includes a vacuum holddown table, conveyor, drum or the like having a porous or perforated work supporting bed through which a vacuum is drawn by an associated vacuum chamber. A sheet or panel of substantially air impervious material overlies the work and the porous bed so that when a vacuum is applied thereto the work supported on the bed is drawn tightly thereagainst by virtue of the air-impervious sheet or panel being drawn toward the bed by the vacuum. When used for holding layups of fabric or other sheet material, the porous bed is preferably part of a table and includes a longitudinal series of sheet material supporting zones to which vacuum is selectively applied in response to the movement of a cutter, spreader or other tool also cooperating with the table.

BRIEF DESCRIPTION OF THE DRAWINGS

FIG. 1 is a fragmentary plan view of apparatus embodying the present invention and illustrating a method for practicing the invention.

FIG. 2 is a fragmentary side elevational view of the apparatus of FIG. 1.

DETAILED DESCRIPTION OF PREFERRED EMBODIMENTS

Figure 3:
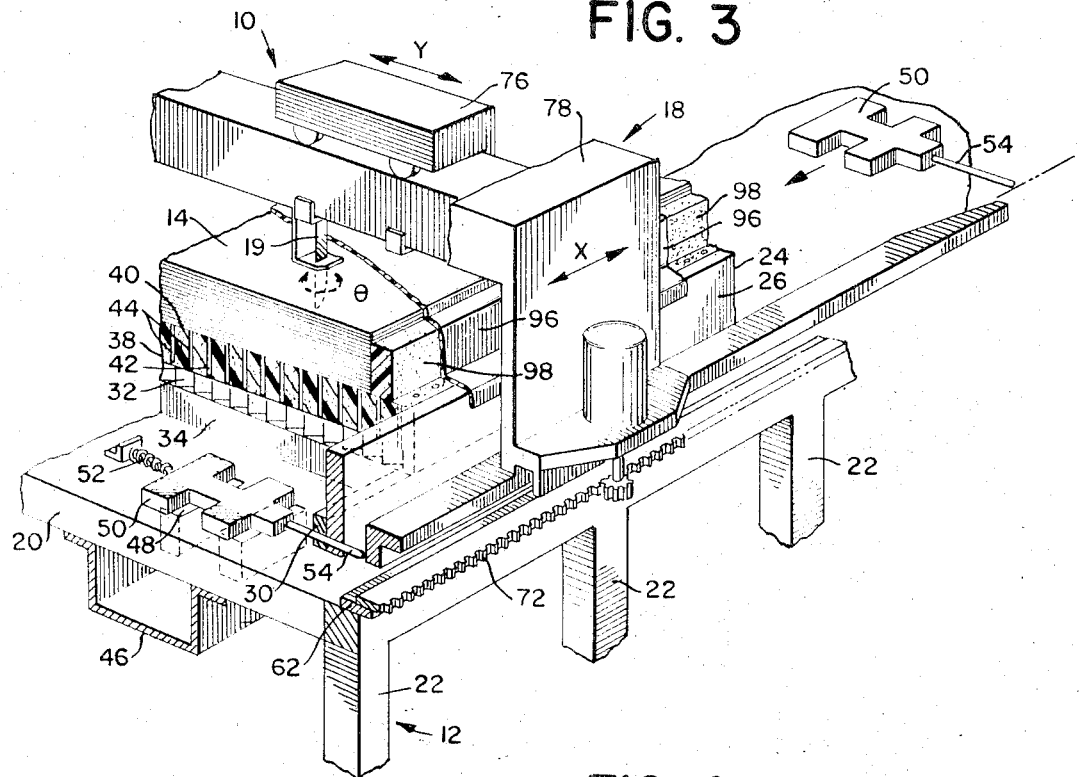
FIG. 3 is a fragmentary perspective view partially in section taken generally along the line 3—3 of FIG. 2.

Turning now to the drawings, and first considering FIGS. 1 to 4, an apparatus for working on fabric and other sheet materials and including a holding apparatus made in accordance with the invention is indicated generally at 10. The apparatus 10 is particularly adapted to spread or layup sheet material and to cut the material in response to input signals supplied to the apparatus by an associated control means such as, for example, a computerized or numerically controlled controller (not shown). More particularly, the apparatus 10 comprises an elongated vacuum holddown table indicated generally by the reference numeral 12 to provide support for a layup 14 which comprises layers of sheet material arranged in face-to-face or face-up vertically stacked relation. A spreading tool indicated generally at 16 and supported for movement longitudinally of the table in response to signals supplied by the controller serves to spread sheet material to form the layup 14. A cutting tool designated generally by the reference numeral 18 is supported to traverse the surface of the table 12 in two coordinate directions indicated by the arrows X and Y in response to position signals supplied by the controller. The cutting tool may take various forms but preferably, and as shown, it includes a blade 19 supported for vertically reciprocating movement in cutting engagement with the layup 14. The blade 19 is movable along any line which may be straight or curved as required in cutting a garment component or the like and is further arranged for rotation about its own axis in a direction indicated by the arrow $\theta$ and for vertical movement into and out of cutting engagement with the layup 14.

The apparatus 10 also includes means for applying vacuum to the holddown table to position and smooth or remove wrinkles from the sheet material as it is spread and to hold it firmly in position on the table during the cutting operation. The latter means is responsive to longitudinal movement of either tool, as will be hereinafter further discussed.

Figure 4:
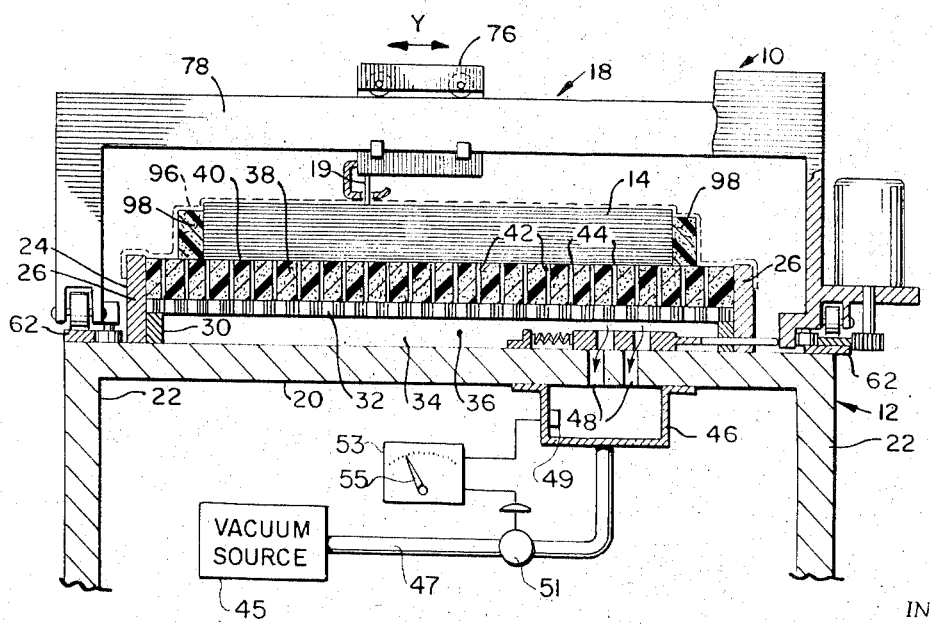
FIG. 4 is a sectional view taken generally along the line 4—4 of FIG. 2.

Considering the apparatus 10 in further detail, the table 12 comprises a generally horizontally disposed base plate 20 supported at convenient working height by a plurality of legs 22, 22. On the upper surface of the plate 20 there is mounted a generally rectangular frame 24 formed by longitudinally extending side members 26, 26 and transversely extending end members (not shown). A vertical spacing member 30 positioned inwardly adjacent each side member 26 extends longitudinally of the table between the end members to provide support for a perforated plate 32. Preferably, the plate 32 is made from expanded metal and spaced above the plate 20 and below the upper or free edge of the frame 24. A longitudinally spaced series of partitions 34, 34 extend transversely of the frame 24 between the spacers 30, 30 and the plates 20 and 32 to define a longitudinal series of chambers 36, 36 between the latter plates as best shown in FIG. 4.

A bed of material 38 is supported in the frame 24 by the plate 32 and has an upwardly facing fabric supporting surface 40 which includes a longitudinal series of fabric supporting zones 41, 41. Each zone 41 is associated with and located above a chamber 36. Various materials may be used to form the bed 38, but preferably it comprises a resilient low density cellular polyethylene plastic material which may be readily penetrated by the blade 19. The blade 19 is preferably adjusted to penetrate the table to assure accurate and efficient cutting of the lower layers comprising the layup. Ethafoam, a product of Dow Chemical Company, has proven particularly suitable as a bed material. The bed material includes a plurality of passageways passing therethrough for conducting vacuum from the chambers 36, 36 to the upper surface of the bed material which supports the material to be cut. If the bed material is porous, as for example, a foamed plastic with an open cell structure, the porosity of the material may be used to provide these passageways. Preferably, however, the bed material is one which is substantially non-porous, as for example, a foamed plastic with a closed cell structure, and the vacuum transmitting passageways consist of vertically extending passageways 42, 42, as shown, drilled or otherwise formed in the bed and passing therethrough generally perpendicular to the supporting surface. As shown, each passageway at its upper end or in the plane of the supporting surface 40 terminates in an opening 44.

Vacuum is applied to the table 12 by a vacuum chamber or duct 46 which extends longitudinally of the table below the plate 20 and is connected to a suitable vacuum source 45 through a conduit 47, the vacuum source preferably being one of high flow rate capacity. A longitudinally spaced series of slots or ports 48, 48 formed in the plate 20 communicate with the duct 46 and with each of the chambers 36, 36. In the illustrated embodiment, two ports 48, 48 communicate with each chamber 36.

Application of vacuum of the table 12 is controlled by a plurality of slide valves 50, 50 mounted on the upper surface of the plate 20. Each valve 50 is associated with a pair of ports 48, 48 and is arranged for transverse sliding movement on the plate 20 between open and closed positions indicated, respectively, at 50 and 50' in FIG. 1. Each valve is biased toward its closed position by a spring 52 and movable to its open position in response to force applied to the free end of an associated control rod or follower 54 which projects from the body of the valve, passes through an associated spacer 30 and side member 26, and projects outwardly beyond the side member. Control means are also provided for maintaining the vacuum applied to the passageways of the bed 38 at a substantially constant predetermined level despite changes in the flow rate of air therethrough. As shown in FIG. 4 this control means comprises a pressure sensor 49 in the vacuum duct 46, a control valve 51 in the conduit 47 and a controller 53. The controller 53 is responsive to the sensor 49 to operate the valve 51 as required to maintain a constant level of vacuum in the duct 46, the level maintained being adjustable by means of a set-point adjustment member 55 on the controller 53.

The spreader 16 is of a generally conventional type for face-to-face or face-up spreading of rolled fabric or other sheet material and comprises a supporting carriage 58 arranged to travel on rollers 60, 60 which engage ways 62, 62 fastened to and extending longitudinally of the table 12. Additional rollers 63, 63 mounted on the carriage 58 engage the inner sides of the ways 62, 62 to maintain the carriage in longitudinal alignment with the table 12. A roll or bolt of material designated at 64 is supported by a rod 66 which extends tranversely of the carriage 58. A drive motor 68 mounted on the carriage and responsive to input signals from the controller carries a pinion 70 which engages a longitudinally extending rack 72 mounted on the table 12 to drive the carriage in the X direction. The carriage also has an elongated cam element 73 which includes a cam surface 74 adapted to engage and move each successive follower 54 as the carriage 58 moves longitudinally of the table. The cam surface 74 is of somewhat greater longitudinal extent than the longitudinal distance between three successive followers 54, 54. Thus, as the carriage 58 moves longitudinally of the table 12 the followers 54, 54 are successively engaged and each valve 50 is moved to and held in its open position until the cam surface 74 engages and opens the next successive valve 50.

The blade 19 is driven in cutting engagement with the layup 14 by a drive unit 76 supported for movement transversely of the table 12 by a movable supporting carriage 78 which bridges the table. The drive unit 76 is arranged to raise and lower the blade 19 relative to the table surface 40 and to move in its Y and $\theta$ directions in response to input signals from the controller as the carriage simultaneously moves the drive unit and blade in the X direction. Each end of the carriage is supported by a pair of rollers 80, 80 which travel on an associated way 62. A drive motor 84 secured to the carriage 78 and responsive to input signals from the computer carries a pinion 86 which engages the rack 72 to drive the carriage in the X direction. The carriage 78 also includes an elongated cam element 86 secured to one side thereof which has a cam surface 88 for engaging the followers 54, 54 to move the valves 50, 50 to their open positions. The longitudinal dimension of the cam surface 88 is at least equal to the longitudinal distance between four successive cam followers 54, 54. Thus, when the valve 50 associated with the cutting zone in which the blade 19 is operating is in its open position the valves associated with the zones adjacent the cutting zone will also be open. In FIG. 1 the cutting zone is designated at 41'.

Preferably, the cutting tool carries at least one panel adapted to overlie an associated portion of the upper surface of the layup 14 as the cutting tool moves longitudinally of the table 12. The illustrated apparatus 10 includes two longitudinally spaced apart panels or endless belts 90, 90 positioned at opposite sides of the blade 19. Each belt 90 is made from non-permeable plastic and supported by a pair of longitudinally spaced rollers 92, 92 journaled for rotation about transversely extending axes by arms 94, 94 which project longitudinally and in opposite directions from opposite sides of the carriage. The blets 90, 90 are preferably arranged for vertical adjustment relative to the carriage to accommodate layups or stacks of material of various height, so that the belts will rest on the upper surface of the material as the cutting tool 18 travels longitudinally relative to the table 12.

Considering now the operation of the apparatus 10, the spreading tool 16 and the cutting tool 18 are independently operative and when one of the tools is in operation the other is or may be positioned in an inactive area at one or the other end of the table 12, or, if desired, a transfer device (not shown) may be provided to move the tool not in use to a suitable storage position away from the table.

The spreading tool 16 moves in the X direction in response to input signals from the controller as sheet material is paid out from the bolt 64 in conventional manner. As the spreading tool advances, each valve 50 in its path of travel is successively opened by the cam element 73 so that vacuum is applied to a table zone 41 in which the material is being spread. Each valve 50 remains in its open position until the cam element 73 engages and opens the next successive valve. Thus, the vacuum hold-down table 12 exerts a substantially continuous smoothing effect upon sheet material as it is spread longitudinally of the table surface. When the material is of a porous type, such as a woven fabric, vacuum acts upon an associated region of the lower surface of the fabric as it is brought into contact with the table surface 40 and also acts through the lower layers of fabric to exert smoothing effect upon an associated region of the lower surface of each successive upper layer comprising the layup.

When a layup of porous material is to be cut a substantially imperforate or air-impervious expendable panel 96 which may be readily cut by the blade 19 is preferably first positioned in overlying relationship with the layup as shown in FIGS. 3 and 4. The panel is imperforate in the sense that it is substantially impervious to the passage of air therethrough. Relatively thin flexible plastic film, such as polyethylene sheet, has proven particularly satisfactory for this purpose. When desirable to support fabric layups with thin or weak edges, longitudinally extending guide blocks 98, 98 are positioned adjacent the side edges of the layup before the panel 96 is positioned thereon. These blocks are preferably made of the same material as the bed 38, and in any event are made of a material which may readily be cut into by the cutting tool without damage to the tool. These guide blocks are not, however, necessary in all cases and when not used the panel 96 is spread so as to merely drape over the edges of the fabric layup. In either event the panel is preferably of such a size and so spread as to extend transversely across the full width of the layup, down both sides thereof and across a portion of the supporting surface 40 of the bed adjacent the sides of the layup, thereby completely enveloping the layup.

At the start of the cutting process, the blade 19 is elevated or raised to a position above and moved to a preselected starting position relative to the upper surface of the layup. Thereafter, the blade is lowered to penetrate the layup and the cutting cycle proceeds in accordance with its programmed pattern. As the carriage 76 moves in the X direction, it will be noted that the valve 50 associated with the cutting zone 41' is in its open position so that vacuum is applied to the surface 40 in the latter zone. It will be further noted that the valves 50, 50 associated with zones 41, 41 immediately adjacent the cutting zone 41' will also be in their respective open positions so that vacuum is also applied in latter zones. Vacuum is applied to both the lower surface of the porous material to be cut and through the latter material to the lower surface of the panel 76.

Vacuum is therefore applied to the lower surface of the material to be cut and when such material is porous the vacuum passes through and around such material to the lower surface of the air-impervious panel 76 and causes such panel to be attracted toward the supporting surface to compress or compact the layup. When the material of the layup is non-porous, the vacuum nevertheless passes around such material and applies a vacuum to the lower surface of the panel 76 to produce the same compressing or compacting effect.

The application of vacuum in the above described manner to compress or compact the layup causes the layup to assume a relatively rigid or firm condition with the individual layers of the layup being held tightly relative to one another so as not to shift or move during the cutting process. The compressing or compacting of the layup also has the additional advantage of "normalizing" the layup. That is, fabrics or other materials of different consistencies, particularly those with loose consistencies such as loose weaves, quilted fabrics and knitted goods, are compressed, according to their fluffiness or weight, to a somewhat normal or standard consistency so as to react in a generally uniform manner to the cutting action of the blade, that is, the compacting effect ends to make all materials substantially uniform as far as their reaction to the blade is concerned so that substantially the same cutting tool, feed rate, etc., may be used for many different materials. The amount of fabric compression attained from the application of a given vacuum will, of course, vary. In some instances, the free stack height of a given layup of fabric may be reduced significantly, as for example, from 10 to 50 percent, so that a relatively short cantilevered blade may be used.

It should also be noted that another benefit achieved by the above-described apparatus is that as vacuum is applied to the lower surface of the layup cooling air is drawn downwardly through the slit in the fabric around and behind the blade thereby cooling the blade as it advances in its programmed pattern.

Figure 5:
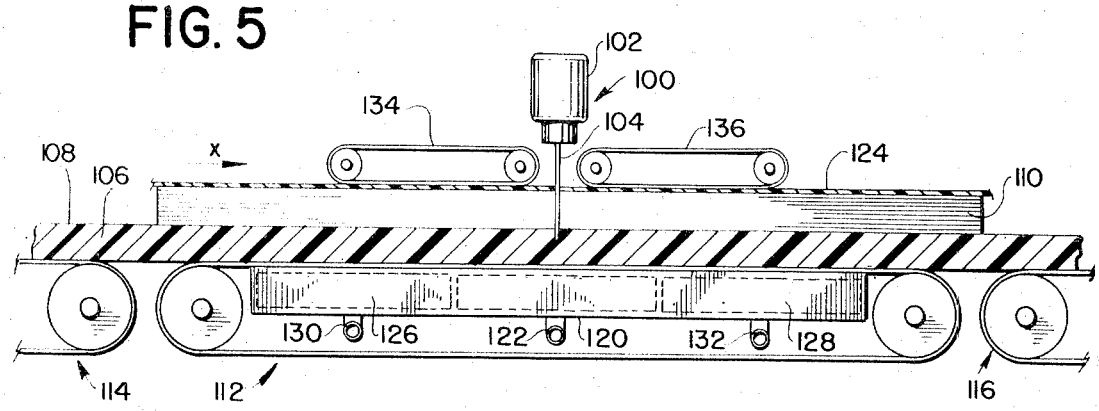
FIG. 5 is a schematic side view of apparatus comprising another embodiment of this invention.

FIG. 5 shows a cutting apparatus, indicated generally at 100, which utilizes a vacuum to hold the fabric or other sheet material while it is being cut but wherein the movement of the cutter relative to the sheet material in one of its two coordinate directions of relative movement is obtained by holding the cutter stationary in such coordinate direction and by instead moving the sheet material bodily in such coordinate direction. The cutter 102 includes a reciprocating blade 104 and operates in conjunction with a bed of penetrable material 106 having a supporting surface 108 on which is received the fabric layup 110. In the cutting zone the bed of penetrable material 106 and the fabric layup 110 is supported by an endless belt conveyor 112 located between two other belt conveyors 114 and 116. The belt of the conveyor 112 is porous and immediately below the cutter 102 a vacuum is applied to the fabric layup 110, through the belt of the conveyor 112 and through the bed of penetrable material 106, by an open topped vacuum chamber 120 connected to a cource of vacuum through the conduit 122. Cooperating with the vacuum chamber 120 is a sheet of air impermeable material 124 which overlies the fabric layup 110 and which is pulled toward the supporting surface 108 by the vacuum to compress and hold the fabric layup in a suitable condition for cutting by the cutter. If desired, and as illustrated, additional vacuum chambers 126 and 128 may be located on opposite sides of the vacuum chamber 120 to apply a vacuum to a larger area of the fabric layup 110, these latter vacuum chambers being connected to the source of vacuum by the conduits 130 and 132, respectively. Either in addition to or in place of the air impermeable sheet 124 the apparatus 100 of FIG. 5 may include two endless belts 134 and 136 of air impermeable material, similar to the endless belts 90, 90 of FIG. 1, for cooperation with the vacuum applied to the layup to hold the layup in a condition for cutting.

Figure 6:
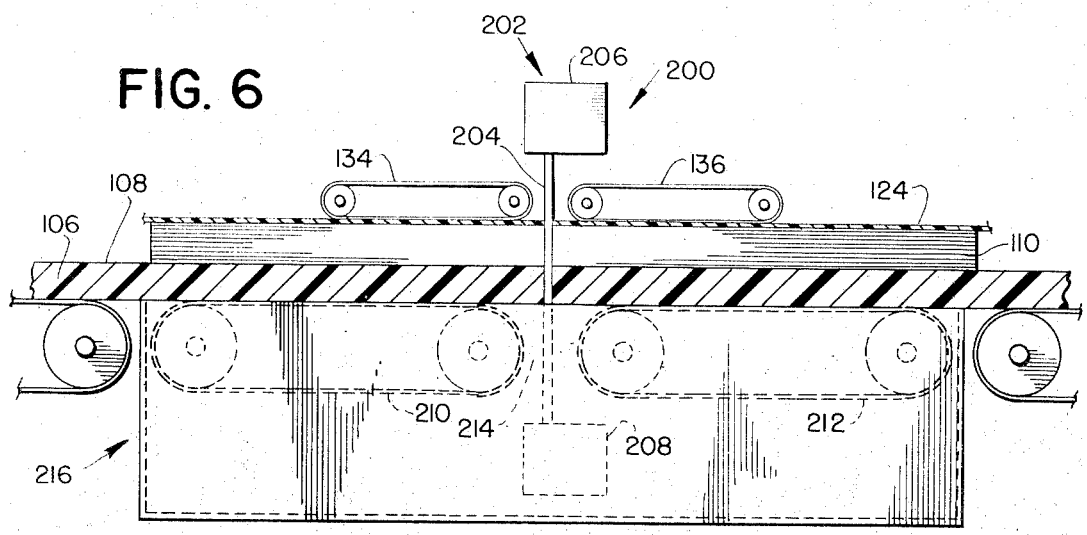
FIG. 6 is a schematic side view of apparatus comprising still another embodiment of this invention.

FIG. 6 shows a cutting apparatus indicated generally at 200 having a cutter, indicated generally at 202, utilizing a cutting blade 204 which passes entirely through the bed 106 of penetratable material used to support the fabric layup 110. The cutter 202 has one main portion 206 located above the bed 106 of supporting material and another main portion 208 located below the bed 106. The cutter 202, may for example, be a bandsaw cutter with the blade 204 having adjacent uptraveling and downtraveling runs and with the portions 206 and 208 being the pulleys, guide rolls, motors and the like required for supporting and driving the blade. The cutter 202 may also be a jigsaw type cutter with the blade 204 being reciprocated vertically along its longitudinal axis. In the vicinity of the blade 204 the bed 106 is supported by two small belt conveyors 210 and 212 which are spaced from one another longitudinally of the bed 106 to form a gap 214 therebetween through which the blade 204 passes. A vacuum chamber defining means, indicated generally at 216, is located below the bed 106 in the vicinity of the cutter 202 and encloses both the lower portion 208 of the cutter and the two conveyors 210 and 212. The vacuum chamber defined by the means 216 is connected to a suitable source of vacuum and applies a vacuum to the undersurface of the bed material 106 which vacuum passes therethrough and acts on the panel 124 to pull said panel toward the supporting surface 108 to compress the layup 110. The belts of the conveyors 210 and 212 are porous so that air may flow therethrough.

Figure 7:
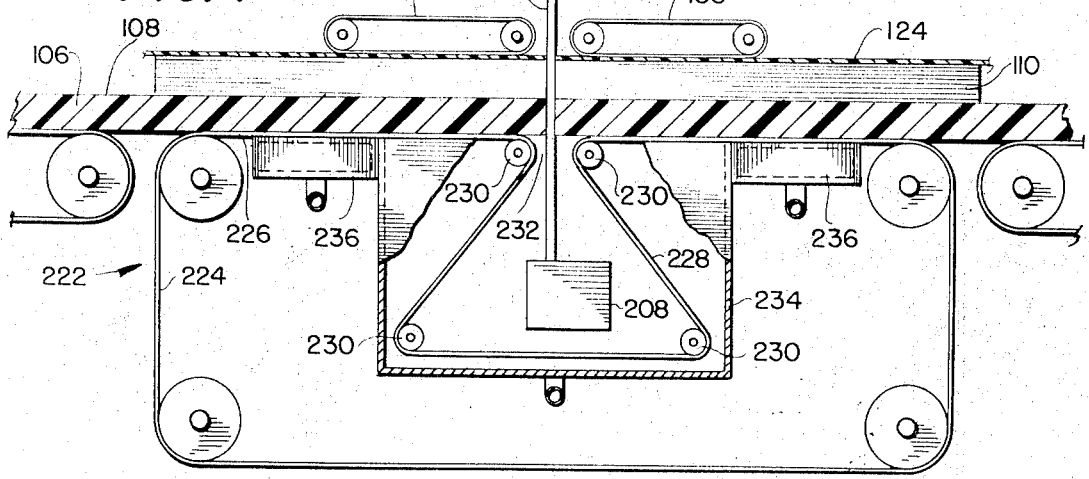
FIG. 7 is a schematic side view showing apparatus comprising yet another embodiment of this invention.

FIG. 7 shows an apparatus, indicated generally at 220, which is generally similar to that of FIG. 6, except that in the vicinity of the cutter 202 the bed of supporting material 106 is supported by a belt conveyor, indicated generally at 222, having a belt 224 with an upper run 226 which supports the bed 106. Along the upper run 226 the belt 224 is trained into a downwardly extending loop 228, by a number of rollers 230, 230, which loop surrounds the lower portion 208 of the cutter. The two upper rollers 230, 230 are located close to the blade 204 so as to form a small gap 232 therebetween through which the blade 204 passes. The belt 226 is porous and the entire loop 228 and the lower portion 208 of the cutter is surrounded by a vacuum chamber defining means or housing 234 which applied vacuum to the lower surface of the bed 106 in the vicinity of the cutter 202. If desired, two additional vacuum chambers 236, 236 may be located on opposite sides of the main chamber 230 to apply vacuum to a greater extent of the supporting bed 106.

Figure 8:
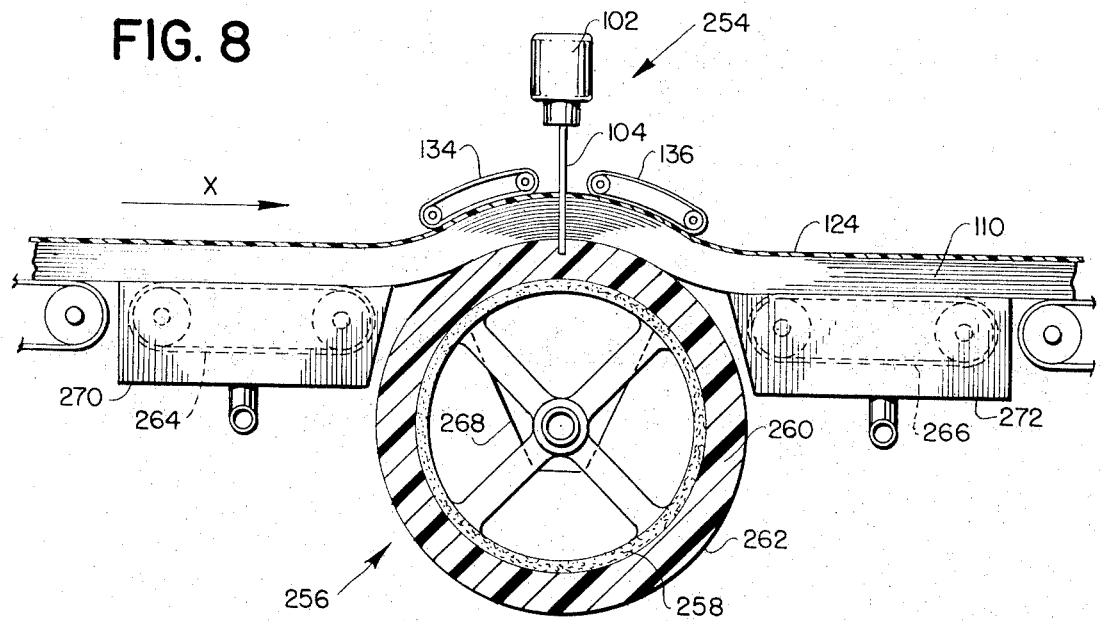
FIG. 8 is a schematic side view of apparatus comprising still another embodiment of this invention.

FIG. 8 shows a cutting device, indicated generally at 254, utilizing a rotary drum, indicated generally at 256, having a porous cylindrical wall 258. A bed of supporting material 260 is received on and surrounds the exterior surface of the drum wall 258, the material 260 preferably being plastic foam and having air conducting passages extending therethrough from its radially inner surface to its radially outer surface 262. The drum 256 is so arranged that a portion of the layup 110 travels thereover and as the drum is rotated the layup and its associated air impervious overlay sheet 124 is moved in the X direction as indicated by the arrow in FIG. 8. The cutter 102 is movable in the Y direction. To assist in supporting and moving the layup in the X direction, the apparatus further includes two small belt conveyors 264 and 266 located on opposite sides of the drum. In the vicinity of the drum 256 vacuum is applied to the bottom surface of the layup 110 by a vacuum chamber defining means or housing 268 located within the drum and having an upwardly facing opening which exposes that portion of the cylindrical wall 258 registered therewith to the vacuum therein. Additional vacuum chambers 270 and 272 may be used on either side of the drum 256 for producing a vacuum over a greater extent of the layup 110. The chambers 270 and 272 preferably enclose, respectively, the conveyors 264 and 266, as shown.

Figure 9:
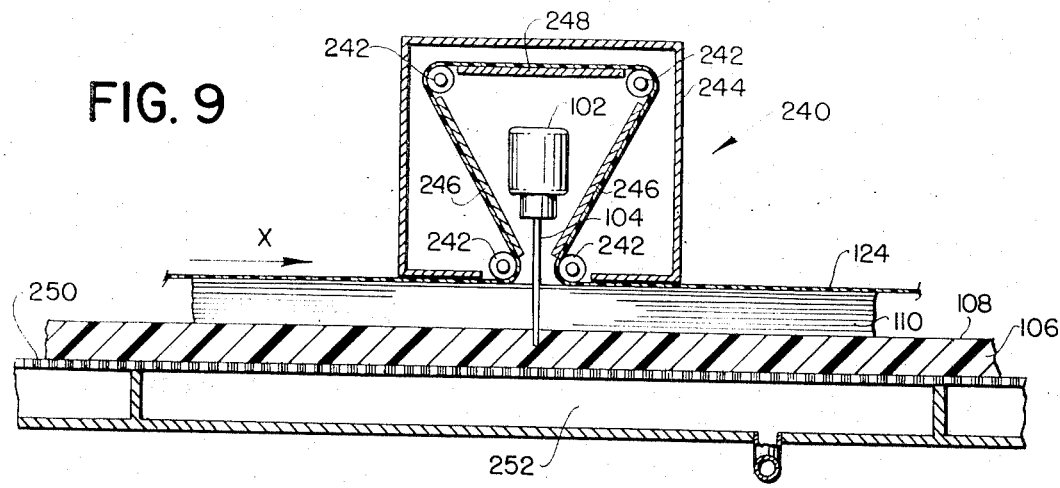
FIG. 9 is a schematic side view of apparatus comprising still another embodiment of this invention.

FIG. 9 shows a cutting apparatus 240 in which the air impervious sheet 124 which is used to overlie the layup 110 is trained in a traveling loop over the cutter 102 so as to permit the sheet 124 to overlie the entire exposed surface of the layup while nevertheless avoiding the necessity for cutting such sheet with the cutting tool. As shown in this figure, the air impervious sheet 124 is trained over the cutter 102 and into a loop by four rollers 242, 242, supported by an associated housing 244. Between the rollers the sheet is backed up by plates 246, 246 and 248 to resist the tendency of the loop to collapse toward the cutter by the vacuum existing within the loop. The housing 244, rollers and backing plates travel with the cutter 202 in the X direction as indicated by the arrow, and the cutter 102 moves in the Y direction. In FIG. 9, the bed of supporting material 106 is shown supported on a perforated wall 250 below which is one or more vacuum chambers such as shown at 252, for applying vacuum to the bed material.

In referring back to FIGS. 6 and 7, it will be noted that the cutting apparatus 200 and 220 shown thereby both utilize a cutter having one main portion 206 located above the material being cut and another main portion 208 located below the material being cut with the cutting tool 204 passing through the material being cut and through the bed 106 of penetrable supporting material. The bed 106 of penetrable supporting material is supported by a conveyor means having an upper supporting surface which supports the penetrable bed and which moves in the X coordinate direction to drive the bed and the material being cut in such direction. The cutting tool is in turn accommodated by a gap in the supporting surface of the conveyor means at the cutting zone. In the device 202 of FIG. 6, this gap is provided by constructing the conveyor means so as to include, adjacent the cutting zone, two small belt conveyors 210 and 212 which are spaced longitudinally from one another to form a gap 214 through which the tool passes. In the device 220 of FIG. 7, a gap 232 for the cutting tool is formed by constructing the conveyor means to include at the cutting zone a belt conveyor having its belt 228 trained around a number of rollers, as shown in FIG. 7, to provide the gap and surround the lower portion 208 of the cutter.

Figure 10:
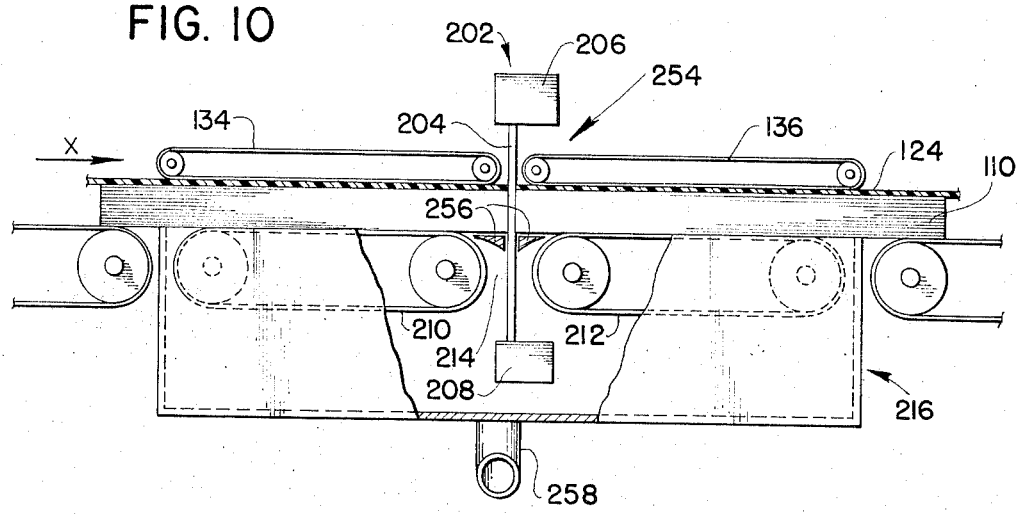
FIG. 10 is a schematic side view showing apparatus comprising still another embodiment of this invention.

If desired, in cutting devices such as shown in FIGS. 6 and 7, wherein the cutting tool passes through a gap in the supporting surface of the conveyor means at the cutting zone, the bed of penetrable supporting material may be omitted with the layup of material to be cut being supported directly on the movable supporting surface of the conveyor means. Such a construction is shown, by way of example in FIG. 10, which illustrates a cutting device, indicated generally at 254, which is substantially similar to that of FIG. 6 except for the omission of the bed of penetrable supporting material. More particularly, the device 254 includes a cutter 202 having a main upper portion 206 located above the fabric layup 110 and a lower portion 208 located below the fabric layup 110, and a cutting blade 204 which extends between the two portions 206 and 208 and through the layup 110. To move the layup 110 in the illustrated X coordinate direction, the cutting device 254 includes a conveyor means having an upwardly facing supporting surface for receiving the layup 110, and which in the vicinity of the cutting zone includes the illustrated two small belt conveyors 210 and 212 which are spaced longitudinally of one another to form a gap 214 therebetween through which the blade 204 passes. If desired, additional supporting means for the layup 110 may be used between the adjacent ends of the conveyors 110 and 212. Such means are shown in FIG. 10 and consist of two stationary support members 256, 256 located to the front and rear respectively of the blade 204 and having upwardly facing support surfaces in the same plane as the upper supporting surface of the belt conveyors 210 and 212. Similarly to the device 200 of FIG. 6, the device 254 of FIG. 10, also includes a vacuum chamber defining means, indicated generally at 216, containing the two end-to-end belt conveyors 210 and 212. The vacuum chamber defined by the means 216 is connected to a suitable source of vacuum through a conduit 258 and applies vacuum through the belts of the belt conveyors 210 and 212 to the layup 210, the upper runs of these belts constituting the supporting surfaces for the layup. The vacuum passing through the layup acts on an overlying air-impervious panel and pulls the panel towards the supporting surfaces of the belt conveyors 210 and 212 so as to compress the layup 110 therebetween. The air-impervious supporting panel may be either a panel 124 overlying the entirety of the layup 110 and moving therewith or may be two belts 134, 136 of such material located on opposite sides of the cutting tool. That is, the belts 134 and 136 of air-impervious material may be used by themselves without the panel 124, or the panel 124 may be used by itself without the belts 134, 136. As a further alternative both the panel 124 and the belts 134 and 136 may be used simultaneously, the belts 134 and 136, in this case serving to seal the cuts made in the panel 124 by the cutting tool 204. Of course, it will be understood that the belts of the conveyors 210 and 212 are porous so that air may flow therethrough and are exposed at the top of the vacuum chamber defining means 216 so as to receive the layup 110.

Each of the devices illustrated in FIGS. 1 to 10 are intended primarily for use in holding sheet material, such as layups of fabric, while cutting or other work processes are performed thereon. The means used for holding the sheet material in each of these devices consists of a means providing a supporting surface for receiving the material, a means for providing a vacuum adjacent the supporting surface, and an air-impervious panel or sheet overlying the material which sheet is drawn toward the supporting surface by the vacuum so as to draw the material tightly against the supporting surface and thereby hold it rigidly in place. This means for holding the material is not, however, necessarily limited to sheet material and may be used to advantage in rigidly holding in place various other types of materials or objects. That is, the described holding means may be used as a holder or chuck for holding various other objects in place while they are worked on or the like. This means of holding is particularly beneficial for use with delicate objects which might be deformed by high localized pressures applied by other types of chucks or holders, for use with objects made of nonmetalic material and, therefore, incapable of being held by magnetic chucks, and for use with very oddly or irregularly shaped objects which are difficult to fit to a normal type of chuck. Also, it is particularly beneficial for use in holding very large pieces since such pieces may be held in a very rigid and firm condition with the use of only a relatively low vacuum. As to this, it is contemplated that the holding means of this invention may be used to hold in a relatively immobile condition a human body or body part, such as an arm or a leg, while the same is being operated on by a surgeon or other physician.

Figure 11:
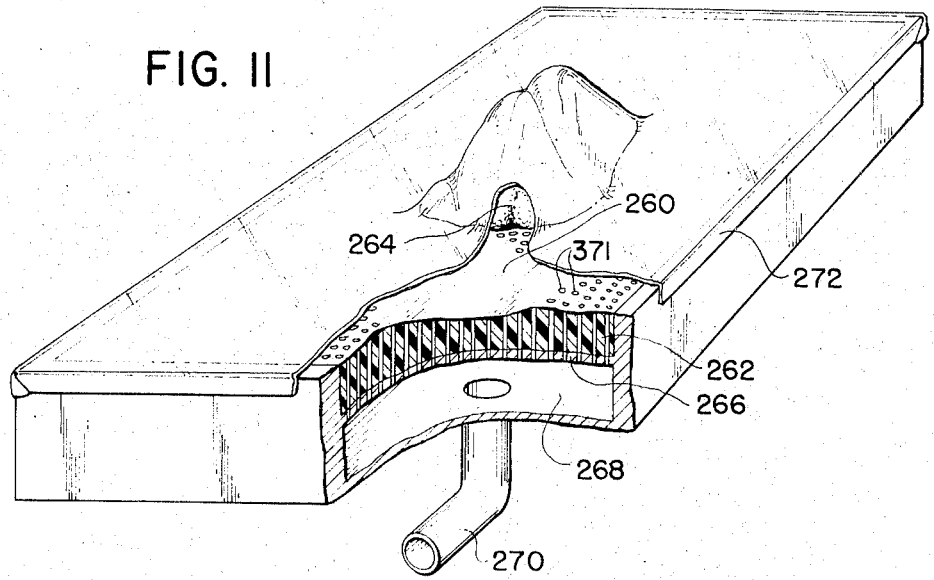
FIG. 11 is a schematic perspective view showing apparatus comprising still another embodiment of this invention.

By way of example, FIG. 11 shows in general the holding means of this invention as applied to an object other than a layup of sheet material. Referring to this figure, the holding means there illustrated comprises a means defining a supporting surface 260 and a means for producing a vacuum adjacent such surface. The supporting surface 260 may be one which is relatively deformable or undeformable depending primarily on the nature of the object to be held in place and the work to be performed thereon. In the illustrated case, the supporting surface is defined by a bed 262 of foamed plastic so that the surface 206 is slightly deformable to accommodate irregularities in the object to be held, such object being indicated at 264. The bed 262 is supported by a rigid perforated plate 266 below which is a vacuum chamber 268 connected to a source of vacuum by a conduit 270. A plurality of small passageways 270, 270 drilled or otherwise formed in the bed 262 allow the passage of air from the surface 260 to the vacuum chamber 268 so that the vacuum of the chamber 268 is applied to the surface 220. Covering the supporting surface 260 and the object 264 is a sheet or panel 272 of air-impervious material. When a vacuum is applied to the vacuum chamber, such vacuum is transmitted to the surface 260 and attracts to it the panel 272, the panel, therefore, being drawn tightly against the surface 260 and against the object 264 to pull the object against the surface 260 and to hold it firmly in place. With the object 264 held in place by the panel 272, as shown in FIG. 11, work may now be performed thereon. Such work will normally require the cutting away or pentration of the panel 272 over a portion of the object 264, but normally such local cutting of the panel 272 will not significantly reduce the holding power thereof as long as the air flow provided by the vacuum pump is sufficient to result in a significant pressure drop across the remainder of the panel. Also, after the panel has been cut to some extent or removed over small areas of the object to perform work on the object, such cuts or uncovered areas may be sealed or patched by applying thereto small patches of air-impermeable sheet material, thereby restoring the full holding power of the device and allowing further work to proceed on the object 264.

We claim:

1. An apparatus for holding an object in a rigid condition, said apparatus comprising means defining a surface for supporting an object received thereon, a piece of substantially air-impervious sheet material overlying at least a portion of the exposed surface of the object received on said supporting surface, means for producing a vacuum adjacent said supporting surface which acts on said sheet of air-impervious material and pulls it toward said supporting surface so as to compress said object between it and said supporting surface, said supporting surface defining means including a bed of supporting material having air flow passages passing therethrough communicating with said supporting surface, and said means for producing a vacuum adjacent said supporting surface comprising a vacuum chamber located on the opposite side of said bed from said supporting surface and communicating with said air flow passages, said bed of supporting material being made of foamed plastic.

2. An apparatus for holding an object as defined in claim 1 further characterized by said foamed plastic being a material which is substantially non-porous and said passages passing therethrough consisting of passageways extending therethrough and formed by means other than the porosity of said material.

3. An apparatus for holding an object in a rigid condition, said apparatus comprising means defining a surface for supporting an object received thereon, a piece of substantially air-impervious sheet material overlying at least a portion of the exposed surface of the object received on said supporting surface, means for producing a vacuum adjacent said supporting surface which acts on said sheet of air-impervious material and pulls it toward said supporting surface so as to compress said object between it and said supporting surface, a stationary member, and means for moving said supporting surface relative to said stationary member in one coordinate direction so as to also move in such coordinate direction said object held to said supporting surface by said air-impervious sheet, said means for moving said supporting surface relative to said stationary member including a belt conveyor having a belt with an upwardly facing upper run adjacent said supporting surface, means associated with said upper run of said belt for forming a gap therein by training said belt along said upper run into a downwardly extending loop, and said means for producing a vacuum adjacent said supporting surface including means defining a vacuum chamber located adjacent said upper run of said belt, on the opposite side thereof from said supporting surface, and said belt being porous so that air may flow therethrough from said supporting surface to said vacuum chamber.

4. An apparatus for holding an object in a rigid condition, said apparatus comprising means defining a surface for supporting an object received thereon, a piece of substantially air-impervious sheet material overlying at least a portion of the exposed surface of the object received on said supporting surface, means for producing a vacuum adjacent said supporting surface which acts on said sheet of air-impervious material and pulls it toward said supporting surface so as to compress said object between it and said supporting surface, a stationary member, and means for moving said supporting surface relative to said stationary member in one coordinate direction so as to also move in such coordinate direction said object held to said supporting surface by said air-impervious sheet, said means defining said supporting surface comprising a rotatable drum having a porous cylindrical wall, and said means for producing a vacuum adjacent said supporting surface including means defining a vacuum chamber located on the inside of said drum and exposing at least a portion of the interior surface of said cylindrical wall to the vacuum therein.

5. An apparatus for holding an object in a rigid condition, said apparatus comprising means defining a surface for supporting an object received thereon, a piece of substantially air-impervious sheet material overlying at least a portion of the exposed surface of the object received on said supporting surface, means for producing a vacuum adjacent said supporting surface which acts on said sheet of air-impervious material and pulls it toward said supporting surface so as to compress said object between it and said supporting surface, a stationary member, and means for moving said supporting surface relative to said stationary member in one coordinate direction so as to also move in such coordinate direction said object held to said supporting surface by said air-impervious sheet, said means for moving said supporting surface relative to said stationary member including two belt conveyors having upper runs adjacent said supporting surface and arranged end to end so as to form a gap therebetween, and said means for producing a vacuum adjacent said supporting surface including means defining a vacuum chamber located on the side of each of said belt conveyors opposite from said supporting surface, each of said belt conveyors having a belt which is porous so that air may flow therethrough from said supporting surface to said vacuum chamber.

6. An apparatus for holding an object as defined in claim 5 further characterized by said supporting surface being defined by a separate bed of supporting material received on said belt and having air-flow passages passing therethrough.

7. An apparatus for holding an object as defined in claim 5 further characterized by said supporting surface being defined by one surface of each of said belts.

8. An apparatus for holding sheet material, said apparatus comprising means including a bed of supporting material made of foamed plastic and defining a supporting surface for supporting sheet material spread thereover, a piece of substantially air-impervious sheet material overlying at least an associated portion of the exposed surface of the material spread over said supporting surface, and means for producing a vacuum adjacent said supporting surface which acts on said sheet of air-impervious material and pulls it toward said supporting surface so as to compress said sheet material between it and said supporting surface.

9. An apparatus for holding sheet material as defined in claim 8 further characterized by said foamed plastic being a material which is substantially non-porous and having passageways extending therethrough to said supporting surface and formed by means other than the porosity of said material.

10. An apparatus for holding a layup of porous fabric sheets in a relatively rigid condition during working, said apparatus comprising means defining a surface for supporting a layup received thereon, a panel of substantially air-impervious sheet material overlying at least a portion of the exposed surface of said layup received on said supporting surface, means for producing a vacuum adjacent a portion of said layup spaced from said panel which vacuum is transmitted to said panel through said layup to produce a vacuum directly adjacent the surface of said panel facing said layup so that atmospheric pressure acting on said panel pushes it toward said layup and causes said layup to be compressed between said panel and said supporting surface, said means defining a supporting surface including means for moving said layup longitudinally of itself past a stationary work zone extending transversely of said layup, and means overlying and engageable with said panel in the vicinity of said work zone for sealing cuts made in said panel at said work zone.

11. An apparatus for holding a layup of porous fabric sheets as defined in claim 10 further characterized by said cut sealing means comprising at least one endless belt of air-impermeable material supported for movement with said panel.

12. An apparatus for holding a layup of sheet material and for producing relative movement in at least one coordinate direction between it and a given work zone, said apparatus comprising means for supporting a layup of sheet material, means for producing relative movement of said layup and said given work zone in one coordinate direction, a panel of substantially air-impervious material overlying at least a portion of the exposed surface of said layup, means for producing a vacuum directly adjacent the surface of said air-impervious panel facing said layup so that atmospheric pressure acting on said panel pushes it toward said layup, and means overlying and engageable with said panel in the vicinity of said work zone for sealing cuts made in said panel at said work zone.

13. An apparatus as defined in claim 12 further characterized by said cut sealing means comprising at least one endless belt of air-impermeable material supported for movement in said one coordinate direction with said panel.

14. An apparatus as defined in claim 12 further characterized by said one coordinate direction of relative movement being the direction extending longitudinally of said layup, and said cut sealing means comprising two endless belts each extending transversely of said layup and spaced from one another longitudinally of said layup, said work zone being located in the space between said two belts.

15. In a machine having a tool in the form of a cutting blade adapted to normally pass through and beyond an object in a cutting operation, an apparatus for holding the object in a rigid condition while it is worked on by the cutting blade, said apparatus comprising support means defining a penetrable supporting plane on which said object is placed in a cutting operation for enabling the cutting blade passing through said object to also pass through and beyond the supporting plane, a panel of substantially air-impervious sheet material overlying at least a portion of the exposed surface of said object, and means for producing a vacuum directly adjacent the surface of said air-impervious panel facing said object so that atmospheric pressure acting on said panel pushes it toward said object and causes said object to be compressed between said panel and said supporting plane.

16. The apparatus defined in claim 15 further characterized by said support means comprising a bed having a supporting surface defining said supporting plane and which bed is made of such material as to be readily penetrable by said tool to thereby enable said tool to pass through and beyond the plane of said supporting surface.

17. The apparatus defined in claim 15 further characterized by said support means including two aligned belt conveyors which support the object for movement parallel to the supporting plane, said two belt conveyors being arranged end-to-end with their adjacent ends spaced from one another to form a gap therebetween for receiving said tool and for thereby enabling said tool to pass through the object and the supporting plane.

\* \* \* \* \*